(12) United States Patent
Sharma et al.

(10) Patent No.: US 9,908,102 B2
(45) Date of Patent: Mar. 6, 2018

(54) HIERARCHICAL POROUS MONOLITHS AND METHODS FOR THEIR PREPARATION AND USE

(71) Applicant: Indian Institute of Technology Kanpur, Kanpur, Uttar Pradesh (IN)

(72) Inventors: Ashutosh Sharma, Kanpur (IN); Shishir Katiyar, Kanpur (IN); Kunal Mondal, Kanpur (IN)

(73) Assignee: INDIAN INSTITUTE OF TECHNOLOGY KANPUR, Kanpur (IN)

(*) Notice: Subject to any disclaimer, the term of this patent is extended or adjusted under 35 U.S.C. 154(b) by 251 days.

(21) Appl. No.: 14/683,070

(22) Filed: Apr. 9, 2015

(65) Prior Publication Data
US 2015/0290624 A1 Oct. 15, 2015

(30) Foreign Application Priority Data
Apr. 10, 2014 (IN) .......................... 1015/DEL/2014

(51) Int. Cl.
*B01J 21/08* (2006.01)
*B01J 21/18* (2006.01)
(Continued)

(52) U.S. Cl.
CPC .............. *B01J 23/50* (2013.01); *B01J 21/08* (2013.01); *B01J 21/18* (2013.01); *B01J 23/38* (2013.01); *B01J 23/70* (2013.01); *B01J 31/06* (2013.01); *B01J 35/002* (2013.01); *B01J 35/006* (2013.01); *B01J 35/0013* (2013.01); *B01J 35/04* (2013.01);
(Continued)

(58) Field of Classification Search
None
See application file for complete search history.

(56) References Cited

U.S. PATENT DOCUMENTS

| 6,024,899 A | 2/2000 | Peng et al. |
| 6,515,845 B1 | 2/2003 | Oh et al. |
| (Continued) | | |

FOREIGN PATENT DOCUMENTS

WO WO-2007/140224 A2 12/2007

OTHER PUBLICATIONS

Chang, Y-C. and Chen, D-H., "Catalytic reduction of 4-nitrophenol by magnetically recoverable Au nanocatalyst," Journal of Hazardous Materials, vol. 165, Issue 1-3, pp. 664-669 (Jun. 15, 2009).
(Continued)

*Primary Examiner* — Colin W. Slifka
(74) *Attorney, Agent, or Firm* — Maschoff Brennan

(57) ABSTRACT

Methods of forming a hierarchical porous monolith are provided. The methods include mixing a monomer, a silica precursor and a catalyst in a solvent to form a mixture. The methods also include adding a gelling agent to the mixture to form a polymer-silica composite gel. The polymer-silica composite gel undergoes a phase separation to separate from the solvent and the unreacted silica precursor. The method further includes drying the polymer-silica composite gel to evaporate the solvent to form a polymer-silica monolith and processing the polymer-silica monolith to form at least one of a polymer monolith, a carbon monolith, a silica monolith and a carbon-silica monolith.

14 Claims, 10 Drawing Sheets

(51) Int. Cl.

| | |
|---|---|
| B01J 23/50 | (2006.01) |
| B01J 31/06 | (2006.01) |
| B01J 35/00 | (2006.01) |
| B01J 35/04 | (2006.01) |
| B01J 35/10 | (2006.01) |
| B01J 37/00 | (2006.01) |
| B01J 37/02 | (2006.01) |
| B01J 37/03 | (2006.01) |
| B01J 37/04 | (2006.01) |
| B01J 37/08 | (2006.01) |
| B01J 23/38 | (2006.01) |
| B01J 23/70 | (2006.01) |

(52) U.S. Cl.
CPC ....... B01J 35/1023 (2013.01); B01J 35/1028 (2013.01); B01J 35/1038 (2013.01); B01J 35/1042 (2013.01); B01J 35/1047 (2013.01); B01J 35/1061 (2013.01); B01J 37/0018 (2013.01); B01J 37/036 (2013.01); B01J 37/04 (2013.01); B01J 37/084 (2013.01); B01J 2229/32 (2013.01); B01J 2231/64 (2013.01); B01J 2531/002 (2013.01); B01J 2531/005 (2013.01)

(56) References Cited

U.S. PATENT DOCUMENTS

| | | |
|---|---|---|
| 8,114,372 B2 | 2/2012 | Pak et al. |
| 8,366,979 B2 | 2/2013 | Dai et al. |
| 2004/0029982 A1* | 2/2004 | Erkey .................. B01J 21/18 516/98 |
| 2012/0196745 A1 | 8/2012 | Pak et al. |
| 2012/0234695 A1 | 9/2012 | Mayes et al. |
| 2013/0077207 A1 | 3/2013 | Kirschbaum |
| 2013/0181172 A1 | 7/2013 | Nishi et al. |

OTHER PUBLICATIONS

Esumi, K. et al., "Preparation of PAMAM- and PPI-metal (silver, platinum, and palladium) nanocomposites and their catalytic activities for reduction of 4-nitrophenol," Langmuir, vol. 20, Issue 1, pp. 237-243 (Jan. 6, 2004).

Ferrari, A. C. and Robertson, J. et al., "Interpretation of Raman spectra of disordered and amorphous carbon," Physical Review B, vol. 61, No. 20, pp. 14095-14107 (May 15, 2000).

Fischer, U. et al., "Carbon aerogels as electrode material in supercapacitors," Journal of Porous Materials, vol. 4, Issue 4, pp. 281-285 (Oct. 1997).

Jana, S. et al., "Synthesis of silver nano shell-coated cationic polystyrene beads: A solid phase catalyst for the reduction of 4-nitrophenol," Applied Catalysis A: General, vol. 313, Issue 1, pp. 41-48 (Sep. 25, 2006).

Kim, D. et al., "Synthesis of silver nanoparticles using the polyol process and the influence of precursor injection," Nanotechnology, vol. 17, Issue 16, pp. 4019-4024 (2006).

Lin, Y. et al., "Self-assembled laminated nanoribbon-directed synthesis of noble metallic nanoparticle-decorated silica nanotubes and their catalytic applications," Journal of Materials Chemistry, vol. 22, Issue 35, pp. 18314-18320 (Jul. 16, 2012).

Pradhan, N. et al., "Silver nanoparticle catalyzed reduction of aromatic nitro compounds," Colloids and Surfaces A: Physicochemical and Engineering Aspects, vol. 196, Issues 2-3, pp. 247-257 (Jan. 15, 2002).

Probstle, H. et al., "Button cell supercapacitors with monolithic carbon aerogels," Journal of Power Sources, vol. 105, Issue 2, pp. 189-194 (Mar. 20, 2002).

Saha, S. et al., "Photochemical green synthesis of calcium-alginatestabilized Ag and Au nanoparticles and their catalytic application to 4-Nitrophenol reduction," Langmuir, vol. 26, Issue 4, pp. 2885-2893 (Feb. 16, 2010).

Wang, Z. et al., "Monolithic Carbon-based Nanocomposites with Hierarchical Porosity: Novel Anode Materials for Li Ion Batteries," ECS Transactions, vol. 6, Issue 25, pp. 199-204 (2008).

Ye, L. et al., "Synthesis and characterization of silica/carbon composite aerogels," Journal of American Ceramic Society, vol. 93, Issue 4, pp. 1156-1163 (Apr. 2010).

Zhang, S. et al., "Facile Synthesis of Hierarchically Ordered Porous Carbon via in Situ Self-Assembly of Colloidal Polymer and Silica Spheres and Its Use as a Catalyst Support," Chemistry of Materials, vol. 22, Issue 11, pp. 3433-3440 (May 12, 2010).

Zickler, G. A. et al., "A reconsideration of the relationship between the crystallite size La of carbons determined by X-ray diffraction and Raman spectroscopy," Carbon, vol. 44, Issue 15, pp. 3239-3246 (Dec. 2006).

\* cited by examiner

HIERARCHICAL POROUS MONOLITHS AND METHODS FOR THEIR PREPARATION AND USE

CROSS-REFERENCE TO RELATED APPLICATION

This application claims the benefit of India Patent Application 1015/DEL/2014, filed on Apr. 10, 2014, the contents of which are incorporated herein by reference in its entirety for any and all purposes.

BACKGROUND

Carbon composite materials with high surface area are desirable in many industrial applications such as in catalysis, electrochemical devices and water treatment. Some of the existing techniques for synthesis of silica-carbon composites include pyrolysis of two-phase copolymers formed of carbonaceous and siloxane domains using a sol-gel process. However, such techniques do not provide any control over tenability of porosity of the carbon composite materials.

Further, techniques such as supercritical drying, hydrothermal and colloidal silica based templating methods may be used to produce tailored porous carbon materials with high surface area. However, these techniques are substantially expensive, and are process intensive.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, methods of forming a hierarchical porous monolith are provided. The methods include mixing a monomer, a silica precursor and a catalyst in a solvent to form a mixture. The methods also include adding a gelling agent to the mixture to form a polymer-silica composite gel. The polymer-silica composite gel undergoes a phase separation to separate from the solvent and the unreacted silica precursor. The method further includes drying the polymer-silica composite gel to evaporate the solvent to form a polymer-silica monolith and processing the polymer-silica monolith to form at least one of a polymer monolith, a carbon monolith, a silica monolith and a carbon-silica monolith.

In accordance with another aspect, methods of forming a hierarchical porous monolith are provided. The methods include mixing a monomer, a metal oxide precursor, and a catalyst in a solvent to form a mixture. The methods also include adding a gelling agent to the mixture to form a polymer-metal composite gel. The polymer-metal composite gel undergoes a phase separation to separate from the solvent and the unreacted metal oxide precursor. The methods include drying the polymer-metal composite gel to form a polymer-metal oxide monolith and carbonizing the polymer-metal oxide monolith in an atmosphere of nitrogen. The methods also include heating the polymer-metal oxide monolith to form a carbon-metal oxide monolith and burning carbon from the carbon-metal oxide monolith to form a metal oxide monolith.

In accordance with another aspect, hierarchical porous monoliths having a distribution of micropores, mesopores and macropores are provided. The hierarchical porous monoliths have a surface area of about 500 grams per square meter ($m^2/g$) to about 2600 $m^2/g$.

In accordance with another aspect, catalysts are provided. The catalysts include a hierarchical porous carbon monolith with a plurality of silver nanoparticles embedded therein. The hierarchical porous carbon monolith has a surface area of about 900 $m^2/g$ to about 2500 $m^2/g$.

DETAILED DESCRIPTION

Figure 1:
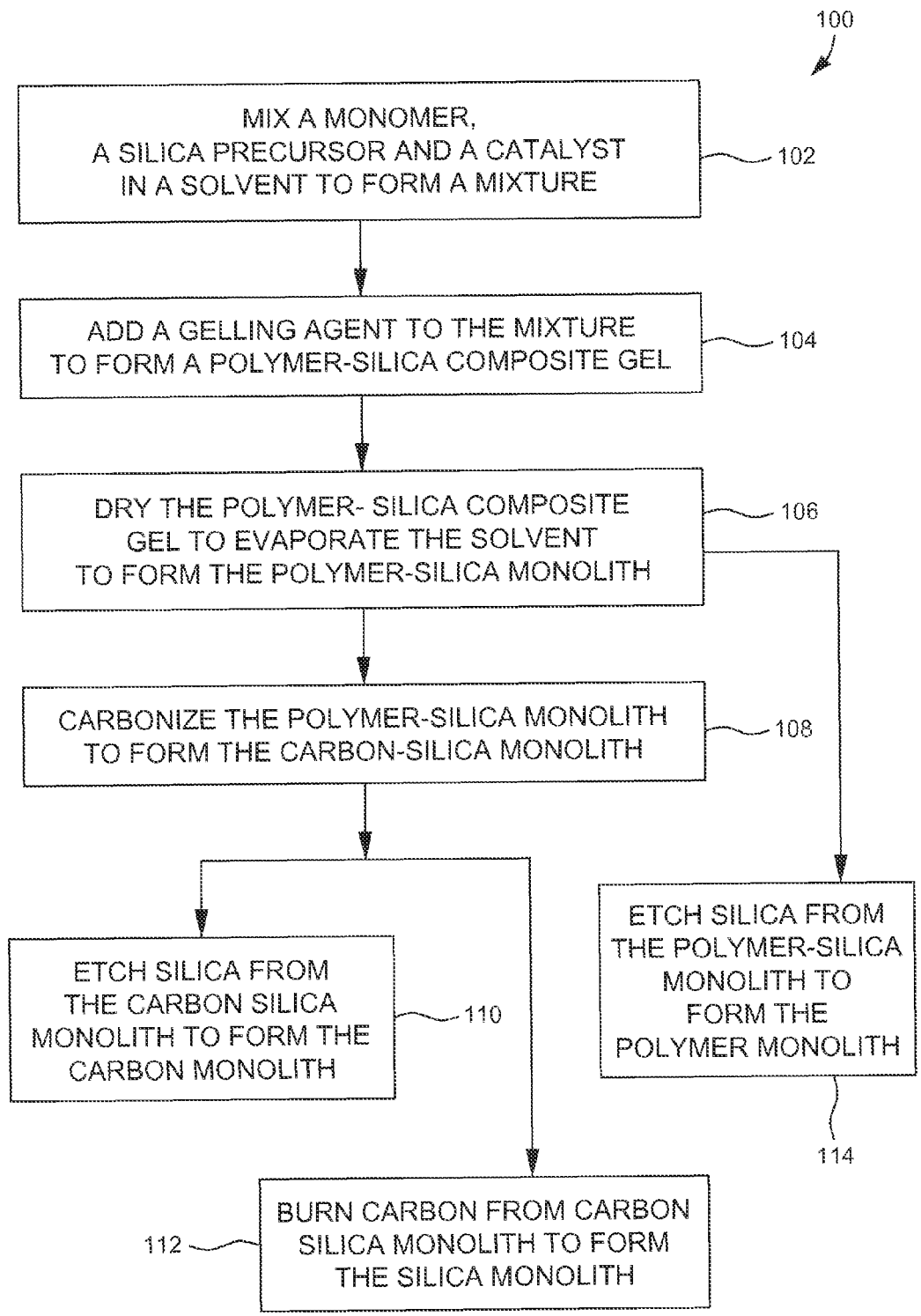
FIG. 1 is an example flow diagram of an embodiment of a method of forming a hierarchical porous monolith.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Some embodiments are generally directed to techniques of forming hierarchical porous monoliths such as polymer monoliths, carbon monoliths, silica monoliths, polymer-silica monoliths and carbon-silica monoliths. The present technique provides an efficient sol-gel process using organic and inorganic precursor materials with phase separation induced during in-situ polymerization to form hierarchical porous monoliths with substantially high surface area and large pore volumes.

The present techniques facilitate formation of hierarchically porous monoliths with tunable porosity in meso, micro and macro-structured domains. Moreover, the techniques are environment friendly and are substantially cost effective. The hierarchically porous monoliths disclosed herein have enhanced mechanical stability and transport properties. Such monoliths can be used as catalyst materials, battery and supercapacitor electrodes, water purifiers, solar cell electrodes, and gas storage materials.

Referring now to FIG. 1, an example flow diagram 100 of an embodiment of a method of forming a hierarchical porous monolith is illustrated. At block 102, a monomer, a silica precursor and a catalyst are mixed in a solvent to form a mixture. Examples of the monomer include, but are not limited to, resorcinol ($C_6H_6O_2$), phloroglucinol ($C_6H_6O_3$), acrylonitrile ($C_3H_3N$), vinyl alcohol ($C_2H_4O$), methyl methacrylate ($C_5H_8O_2$), or combinations thereof. Examples of the silica precursor include, but are not limited to, tetraethyl orthosilicate (TEOS), tetramethyl orthosilicate (TMOS), or combinations thereof. Examples of the catalyst include, but are not limited to, 3-aminopropyl tri-ethoxysilane (APTES), 3-aminopropyl tri-methoxysilane (APTMS), or combinations thereof. Examples of the solvent include, but are not limited to dimethyl sulfoxide (($CH_3)_2SO$), dimethyl formamide (($CH_3)_2NC(O)H$), tetrahydrofuran (($CH_2)_4O$), acetone (($CH_3)_2CO$), ethanol ($CH_3CH_2OH$), methanol ($CH_3OH$), water ($H_2O$), or combinations thereof.

At block 104, a gelling agent is added to the mixture to form a polymer-silica composite gel. In this embodiment, the polymer-silica composite gel is formed by a sol-gel process. Examples of the gelling agent include, but are not limited to, formaldehyde ($CH_2O$), dimethyl sulfoxide (($CH_3)_2SO$), water ($H_2O$), dimethylformamide (($CH_3)_2NC(O)H$), or combinations thereof. In this embodiment, the polymer-silica composite gel undergoes a phase separation to separate from the solvent and the unreacted silica precursor.

At block 106, the polymer-silica composite gel is dried to evaporate the solvent to form a polymer-silica monolith. The drying may generally be performed at any temperature and for any length of time. In one example, the polymer-silica composite gel is dried at a temperature of about 4 degree centigrade (° C.) to about 300° C. to form the polymer-silica monolith. Specific examples of the temperature include about 4° C., about 50° C., about 100° C., about 150° C., about 200° C., about 250° C., about 300° C., and ranges between any two of these values (including endpoints). In one example, the polymer-silica composite gel is dried for a time period of about 10 hours to about 48 hours to form the polymer-silica monolith. Specific examples of the drying time include about 10 hours, about 15 hours, about 20 hours, about 25 hours, about 30 hours, about 35 hours, about 40 hours, about 48 hours and ranges between any two of these values (including endpoints). In this embodiment, a plurality of pores are formed in the polymer-silica monolith.

The polymer-silica monolith may be processed to form at least one of a polymer monolith, a carbon monolith, a silica monolith and a carbon-silica monolith.

In one example, the polymer-silica monolith is pyrolyzed to form the carbon-silica monolith. At block 108, the polymer-silica monolith is carbonized in an atmosphere of nitrogen ($N_2$) and the carbonized polymer silica-monolith is heated to form the carbon-silica monolith. Further, the formed carbon-silica monolith is cooled at ambient temperature.

In some examples, the polymer-silica monolith is heated at an elevated temperature, such as a temperature of about 500° C. to about 1500° C. Specific examples of the temperature include about 500° C., about 750° C., about 1000° C., about 1250° C., about 1500° C., and ranges between any two of these values (including endpoints). Generally any heating rate can be used. In some other examples, the polymer-silica monolith is heated at a heating rate of about 3° C./minute to about 10° C./minute. Specific examples of the heating rate include about 3° C./minute, about 5° C./minute, about 7° C./minute, about 10° C./minute, and ranges between any two of these values (including endpoints). At block 110, silica is etched from the carbon-silica monolith using an alkali hydroxide to form the carbon monolith. Examples of the alkali hydroxide include, but are not limited to sodium hydroxide (NaOH), potassium hydroxide (KOH), or combinations thereof. Other suitable solutions such as hydrofluoric acid (HF) and buffered oxide etch (BOE) may be used to etch silica from the carbon-silica monolith. In some examples, the formed porous carbon monoliths are non-crystalline in nature.

In some embodiments, a plurality of metal nanoparticles are embedded in the carbon monoliths. Examples of the metal nanoparticles include, but are not limited to, silver (Ag) nanoparticles, copper (Cu) nanoparticles, gold (Au) nanoparticles, platinum (Pt) nanoparticles, nickel (Ni) nanoparticles, cobalt (Co) nanoparticles, ferrous (Fe) nanoparticles, titanium dioxide ($TiO_2$), zinc oxide (ZnO), zirconium dioxide ($ZrO_2$), tin dioxide ($SnO_2$), tin oxide (SnO), silicon dioxide ($SiO_2$), or combinations thereof.

In one example embodiment, synthesized metal nanoparticles are embedded in the carbon monoliths by adding the nanoparticles to the mixture. In some other examples, suitable metal precursors are added to the mixture to embed the metal nanoparticles in the formed carbon monoliths. Further, carbon can be burned from the carbon-silica monolith to form the silica monolith (block 112).

In one embodiment, silica is etched from the polymer-silica monolith to form the polymer monolith (block 114). In one example, the silica is etched from the polymer-silica monolith using an alkali hydroxide to form the polymer monolith.

In some examples, concentrations of the monomer, the silica precursor and the catalyst are adjusted to achieve a desired porosity of the polymer monolith, the carbon monolith, the silica monolith, the carbon-silica monolith and the polymer-silica monolith.

Figure 2:
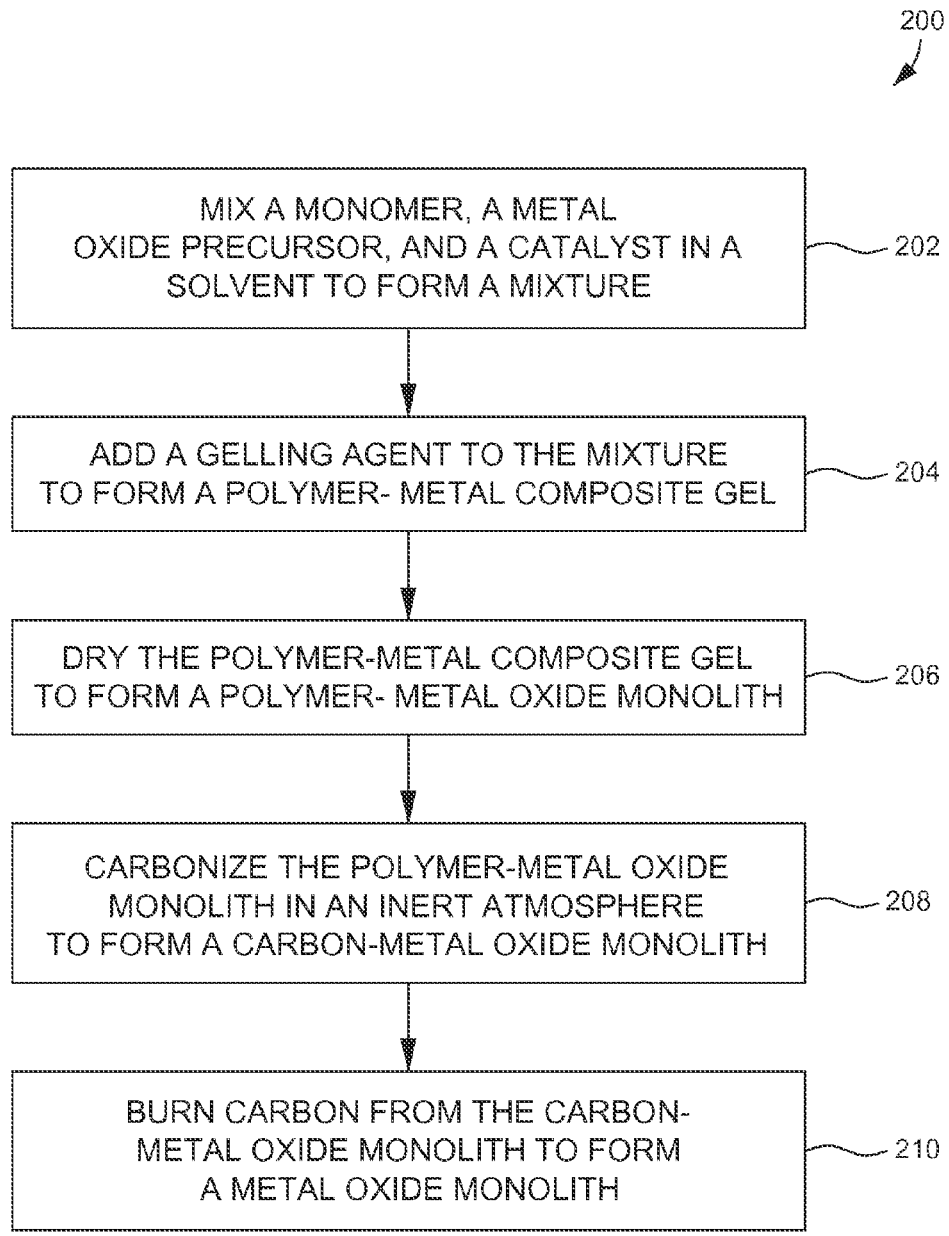
FIG. 2 is an example flow diagram of an embodiment of a method of forming a hierarchical porous metal oxide monolith.

In FIG. 2, an example flow diagram 200 of an embodiment of a method of forming a hierarchical porous metal oxide monolith is illustrated. At block 202, a monomer, a metal oxide precursor, and a catalyst are mixed in a solvent to form a mixture. Examples of the monomer include, but are not limited to, resorcinol ($C_6H_6O_2$), phloroglucinol ($C_6H_6O_3$), acrylonitrile ($C_3H_3N$), vinyl alcohol ($C_2H_4O$), methyl methacrylate ($C_5H_8O_2$), or combinations thereof. Examples of the metal oxide precursor include stannous chloride ($SnCl_2$), stannic chloride ($SnCl_4$), titanium tetrachloride ($TiCl_4$), titanium isopropoxide ($C_{12}H_{28}O_4Ti$), zinc chloride ($ZnCl_2$), zinc nitrate ($Zn(NO_3)_2$), or combinations thereof. Examples of the catalyst include, but are not limited to, 3-aminopropyl tri-ethoxysilane (APTES), 3-aminopropyl tri-methoxysilane (APTMS), or combinations thereof.

At block 204, a gelling agent is added to the mixture to form a polymer-metal composite gel. Examples of the gelling agent include, but are not limited to, formaldehyde ($CH_2O$), dimethyl sulfoxide (($CH_3)_2SO$), water ($H_2O$), dimethylformamide (($CH_3)_2NC(O)H$), or combinations thereof. In this embodiment, the polymer-metal composite gel undergoes a phase separation to separate from the solvent and the unreacted metal oxide precursor.

At block 206, the polymer-metal composite gel is dried to form a polymer-metal oxide monolith. At block 208, the polymer-metal oxide monolith is carbonized in an inert atmosphere to form a carbon-metal oxide monolith. For example, the polymer-metal oxide monolith is carbonized in nitrogen ($N_2$) or argon (Ar) to form the carbon-metal oxide monolith.

At block 210, carbon is burnt from the carbon-metal oxide monolith to form a metal oxide monolith. The burning can be performed in the presence of oxygen gas ($O_2$). In some examples, the metal oxide monolith includes a monolith of silica ($SiO_2$), tin dioxide ($SnO_2$), titanium dioxide ($TiO_2$), zinc oxide (ZnO), indium tin oxide (ITO), or combinations thereof.

In one example embodiment, hierarchical porous monoliths are formed using the process of FIG. 1. As discussed above, a variety of hierarchical porous monoliths such as polymer monoliths, carbon monoliths, silica monoliths, carbon-silica monoliths and polymer-silica monoliths can be formed using the process of FIG. 1.

In some examples, the hierarchical porous monoliths are formed by mixing a monomer, a silica precursor and a catalyst with a solvent to form a polymer-silica composite gel. The formed polymer-silica composite gel is processed to form the monolith comprising at least one of polymer, carbon, silica, the carbon-silica composite and the polymer-silica composite.

In one embodiment, the hierarchical porous monoliths have a distribution of micropores, mesopores and macropores. In one example, the hierarchical porous monolith has a surface area of about 500 square meter per gram ($m^2/g$) to about 2600 $m^2/g$. Specific examples of surface area include about 500 $m^2/g$, about 800 $m^2/g$, about 1100 $m^2/g$, about 1400 $m^2/g$, about 1700 $m^2/g$, about 2000 $m^2/g$, about 2300 $m^2/g$, about 2600 $m^2/g$, and ranges between any two of these values (including endpoints).

In one example, the micropores have a pore volume of about 70 percent (%) to about 85%. Specific examples of pore volume of the micropores include about 70%, about 75%, about 80%, about 85%, and ranges between any two of these values (including endpoints). In this example, the micropores have a pore diameter of about 1 nanometer (nm) to about 2 nm. Specific examples of the pore diameter include about 1 nm, about 1.25 nm, about 1.50 nm, about 1.75 nm, about 2 nm, and ranges between any two of these values (including endpoints).

In one example, the mesopores have a pore volume of about 15% to about 35%. Specific examples of pore volume of the mesopores include about 15%, about 20%, about 30%, about 35%, and ranges between any two of these values (including endpoints). In this example, the mesopores have a pore diameter of about 3 nm to about 50 nm. Specific examples of pore diameter include about 3 nm, about 10 nm, about 20 nm, about 30 nm, about 40 nm, about 50 nm, and ranges between any two of these values (including endpoints).

In one example, the macropores have a pore volume of about 2.5% to about 10%. Specific examples of pore volume of the macropores include about 2.5%, about 3%, about 5%, about 7%, about 10% and ranges between any two of these values (including endpoints). In this example, the macropores have a pore diameter of about 50 nm to about 5000 nm. Specific examples of pore diameter include about 50 nm, about 100 nm, about 500 nm, about 1000 nm, about 1500 nm, about 2000 nm, about 2500 nm, about 3000 nm, about 3500 nm, about 4000 nm, about 4500 nm, about 5000 nm, and ranges between any two of these values (including endpoints).

In one example, the hierarchical porous monolith is a polymer monolith. In this example, the polymer monolith has a surface area of about 200 $m^2/g$ to about 500 $m^2/g$. Specific examples of surface area of the polymer monolith include about 200 $m^2/g$, about 300 $m^2/g$, about 400 $m^2/g$, 500 $m^2/g$, and ranges between any two of these values (including endpoints).

In one example, the hierarchical porous monolith is a carbon monolith. In this example, the carbon monolith has a surface area of about 900 $m^2/g$ to about 2600 $m^2/g$. Specific examples of surface area of the carbon monolith include about 900 $m^2/g$, about 1000 $m^2/g$, about 1500 $m^2/g$, about 2000 $m^2/g$, about 2500 $m^2/g$, about 2600 $m^2/g$, and ranges between any two of these values (including endpoints).

In one example, the hierarchical porous monolith is a silica monolith. In this example, the silica monolith has a surface area of about 500 $m^2/g$ to about 680 $m^2/g$. Specific examples of surface area of the silica monolith include about 500 $m^2/g$, about 525 $m^2/g$, about 550 $m^2/g$, about 575 $m^2/g$, about 600 $m^2/g$, about 625 $m^2/g$, about 650 $m^2/g$, about 675 $m^2/g$, about 680 $m^2/g$, and ranges between any two of these values (including endpoints).

In one example, the hierarchical porous monolith is a carbon-silica monolith. In this example, the carbon-silica monolith has a surface area of about 525 $m^2/g$ to about 633 $m^2/g$. Specific examples of surface area include about 525 $m^2/g$, about 550 $m^2/g$, about 575 $m^2/g$, about 600 $m^2/g$, about 625 $m^2/g$, about 633 $m^2/g$, and ranges between any two of these values (including endpoints).

In one example, the hierarchical porous monolith is a polymer-silica monolith. In this example, the polymer-silica monolith has a surface area of about 250 $m^2/g$ to about 450 $m^2/g$. Specific examples of surface area include about 250 $m^2/g$, about 300 $m^2/g$, about 350 $m^2/g$, about 400 $m^2/g$, about 450 $m^2/g$, and ranges between any two of these values (including endpoints).

In one example embodiment, the monolith includes a plurality of metal nanoparticles embedded therein. Examples of the metal nanoparticles include, but are not limited to, silver (Ag) nanoparticles, copper (Cu) nanoparticles, gold (Au) nanoparticles, platinum (Pt) nanoparticles, nickel (Ni) nanoparticles, cobalt (Co) nanoparticles, ferrous (Fe) nanoparticles, titanium dioxide ($TiO_2$), zinc oxide (ZnO), zirconium dioxide ($ZrO_2$), tin dioxide ($SnO_2$), tin oxide (SnO), silicon dioxide ($SiO_2$), or combinations thereof.

The hierarchical porous monoliths described above can be used in a variety of applications, for example, as catalyst materials, battery electrodes, supercapacitor electrodes, water purifiers, electrodes for solar cells, gas storage materials, or combinations thereof.

In one example, the hierarchical porous monolith is a catalyst. In this example, the catalyst includes a hierarchical porous carbon monolith with a plurality of silver nanoparticles embedded therein. In one example, the hierarchical porous carbon monolith has a surface area of about 900 $m^2/g$ to about 2500 $m^2/g$. Specific examples of surface area include about 900 $m^2/g$, about 1000 $m^2/g$, about 1500 $m^2/g$, about 2000 $m^2/g$, about 2500 $m^2/g$, and ranges between any two of these values (including endpoints).

In one example, the silver nanoparticles have an average diameter of about 40 nm to about 100 nm. Specific examples of average diameter of the silver nanoparticles include about 40 nm, about 50 nm, about 60 nm, about 70 nm, about 80 nm, about 90 nm, about 100 nm, and ranges between any two of these values (including endpoints).

In one example, the hierarchical porous carbon monolith includes micropores with a pore volume of about 70% to about 85%. Specific examples of pore volume of the micropores include about 70%, about 75%, about 80%, about 85%, and ranges between any two of these values (including endpoints).

In one example, the hierarchical porous carbon monolith includes mesopores with a pore volume of about 15% to about 35%. Specific examples of pore volume of the mesopores include about 15%, about 20%, about 30%, about 35%, and ranges between any two of these values (including endpoints).

In one example, the hierarchical porous carbon monolith includes macropores with a pore volume of about 2.5% to about 10%. Specific examples of pore volume of the macropores include about 2.5%, about 3%, about 5%, about 7%, about 10%, and ranges between any two of these values (including endpoints).

In this example, the catalyst has a rate constant of about 0.05/minute to about 0.30/minute for reduction of 4-nitrophenol to 4-aminophenol. Specific examples of rate constant include about 0.05/minute, about 0.10/minute, about 0.15/minute, about 0.25/minute, about 0.30/minute, and ranges between any two of these values (including endpoints).

EXAMPLES

The present invention will be described below in further detail with examples and comparative examples thereof, but it is noted that the present invention is by no means intended to be limited to these examples.

Example 1: Synthesis of the Hierarchical Porous Carbon Monoliths

A polymer-silica composite monolith was synthesized using the example process of FIG. 1. Here, resorcinol ($C_6H_6O_2$), tetraethyl orthosilicate (TEOS), 3-aminopropyl tri-ethoxysilane (APTES), and 3-aminopropyl tri-methoxysilane (APTMS) were mixed in acetone (($CH_3$)$_2$CO) to form a mixture. In this example, the concentration of acetone/resorcinol is about 3 (v/v) to about 10 (v/v) and the concentration of acetone/tetraethyl orthosilicate is about 5 (v/v) to about 15 (v/v). Further, the concentration of acetone/ 3-(APTES) is about 5 (v/v) to about 15 (v/v) and the concentration of acetone/APTMS is about 5 (v/v) to about 15 (v/v). Further, formaldehyde ($CH_2O$) solution was added to the mixture to initiate the sol-gel reaction. The formed solution was stirred for a time period of about 5 minutes to about 10 minutes in a polypropylene container. The container was sealed and was maintained at room temperature for a time period of about 12 hours to form a composite gel. Three samples were prepared from the composite gel and the molar ratios of resorsiuonal and formaldehyde (R:F) were maintained at about 1:3 for all the three samples.

The first sample (generally represented by AE) was formed using 3-aminopropyl tri-ethoxysilane (APTES) as the catalyst. The second sample (generally represented by AM) was formed using 3-aminopropyl tri-methoxysilane (APTMS) as the catalyst and the third sample (generally represented by AE/AM) was formed using APTES and APTMS as the catalysts. The tenability of porosity of the monoliths formed due to structural changes in the meso and micro scale pores was observed by varying the proportion of APTES, and APTMS in the samples.

Moreover, the wet composite gel was subjected to ambient drying at a temperature of about 50° C. for a time period of about 12 hours to obtain polymer-silica composite monoliths with hierarchical porosity. The resulting polymer-silica composite monoliths were observed to be reddish brown in color, lightweight and with ultra-high porosities and low densities. Further, carbonization of the dried composite monoliths was performed in the atmosphere of inert nitrogen ($N_2$) having a flow rate of about 0.15 liters per minute (l/min) with heating up to a temperature of about 900° C. at a heating rate of about 5 degree centigrade per minute (C/min) and a holding time of about 1 hour.

The composite monoliths were then cooled at ambient conditions to form a carbon-silica composite. Subsequently, the carbon-silica composite was subjected to silica etching using 1 molar (M) aqueous sodium hydroxide (NaOH). During the etching process, the silica phase of the composite was eliminated by forming sodium silicate to form hierarchically porous carbon monoliths.

Example 2: Characterization of the Hierarchical Porous Carbon Monoliths

Figure 3:
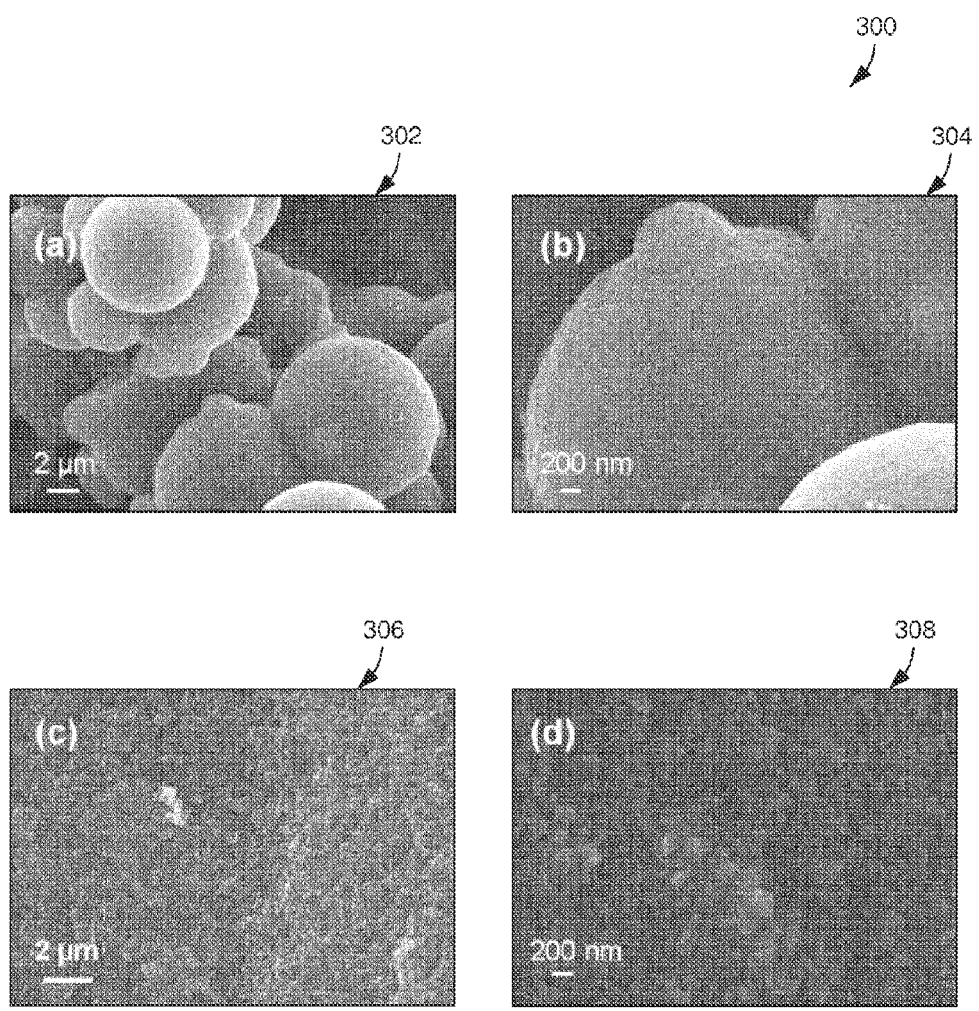
FIG. 3 illustrates example field emission scanning electron microscopy (FE-SEM) micrographs of porous carbon monoliths.

The porous carbon monoliths of Example 1 were characterized by field emission scanning electron microscopy (FE-SEM). FIG. 3 illustrates example field emission scanning electron microscopy (FE-SEM) micrographs 300 of the porous carbon monoliths of Example 1. Here, SEM images of porous carbon monolith formed using APTMS as the catalyst are represented by reference numerals 302 and 304. The image 302 was obtained at an image resolution of about 2 micrometers (μm) and the image 304 was obtained at an image resolution of about 200 nm. As can be seen from the image 304, a large number of micropores were observed in the porous carbon monolith.

Moreover, SEM images of porous carbon monolith formed using APTES as the catalyst are represented by reference numerals 306 and 308. The image 306 was obtained at an image resolution of about 2 μm and the image 308 was obtained at an image resolution of about 200 nm. As can be seen from the image 308, a large number of micropores and mesopores were observed in the porous carbon monolith. Further, no cracks were observed in the porous carbon monoliths.

It was observed from the SEM images 302, 304, 306 and 308 that the porous carbon monolith included a distribution of micropores, mesopores and macropores. The average diameter of the mesopores was measured to be about 50 nm and the average diameter of the micropores was measured to be about 2 nm. Further, the average diameter of the macropores in the porous carbon monoliths was measured to be greater than 50 nm.

Pore morphologies for the porous carbon monoliths formed using APTMS, APTES and both APTMS with APTES as catalyst materials were observed. The porous carbon monolith formed using APTES was observed to have micro and meso porosity dominating pore structure. Here, the pore volume of the micropores was estimated to be about 71% and the pore volume of the mesopores was estimated to be about 27%. Moreover, the formation of micropores and mesopores prevented the macropores in the structure owing to fast gelation.

The pore volume of the micropores in the porous carbon monolith formed using APTMS was estimated to be about 84% and the pore volume of the mesopores was estimated to be about 12.5%. Since the gelation process was substantially slow, a large number of mesopores were converted to micropores due to phase separation. Again, the formation of micropores and mesopores prevented the formation of macropores in the structure.

The porous carbon monolith formed using both APTES and APTMS as the catalysts materials was observed to have the micropores, mesopores and the macropores. Here, the pore volume of the micropores was estimated to be about 68%, the pore volume of the mesopores was estimated to be about 27% and the pore volume of the macropores was estimated to be about 6%. It should be noted that the macropores were formed due to delay in the gelation process, which in turn, facilitated the phase separation to form the macropores.

Figure 4:
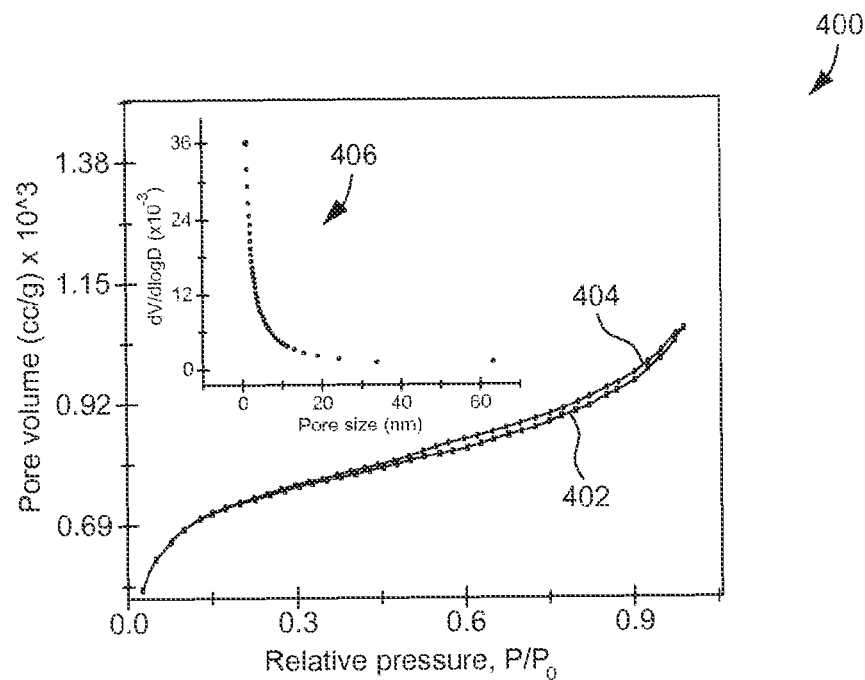
FIG. 4 is an example BET adsorption isotherm of a carbon monolith formed using APTES and APTMS as the catalysts materials.

The pore morphologies of the carbon monoliths of Example 1 were analyzed using Brunauer-Emmett-Teller (BET) adsorption isotherms. FIG. 4 is an example BET adsorption isotherm 400 of a carbon monolith formed using both APTES and APTMS as the catalysts materials. The nitrogen adsorption isotherm for the carbon monolith is represented by reference numeral 402 and the nitrogen desorption isotherm for the carbon monolith is represented by reference numeral 404. As can be seen, the nitrogen adsorption isotherms did not reach saturation at a relative pressure close to unity ($P/P_0=1$) and were observed to exhibit a hysteresis. Moreover, the low-pressure part of the isotherms 402 and 404 are indicative of the isotherms corresponding to type IV for mesoporous and type II for macroporous pore morphology of the materials.

The pore size distribution curve for the carbon monolith is represented by reference numeral 406. The pore size distribution was estimated from nitrogen adsorption isotherm using Barrett-Joyner-Halenda (BJH) technique. The pore size distribution 406 of the carbon monolith depicted existence of a pore structure that included micropores with pore diameter less than 2 nm extending upto macropores with pore diameter greater than 50 nm.

The morphological nature of the carbon monoliths formed using APTES, APTMS and both APTES and APTMS was observed. Here, a small amount of the carbon monolith was mixed with methanol ($CH_3OH$) and was subsequently dried and placed over a clean silicon wafer. The total BET surface area, pore size distribution and average pore diameter of the monoliths were estimated based on the BET data and the estimated values are provided in Table 1. Here, the monolith formed using APTES is represented by AE, the monolith formed using APTMS is represented by AM and the monolith formed using APTES and APTMS is represented by AE/AM. Further, carbon-silica monolith formed using APTES is represented by $AE/SiO_2$, the carbon-silica monolith formed using APTMS is represented by $AM/SiO_2$ and silica monolith is represented by $SiO_2$.

TABLE 1

| Sample | $P/P_0$ | Total pore volume (cc/g) | BET area ($m^2/g$) | Micropore volume (cc/g) | Mesopore volume (cc/g) | Macropore volume (cc/g) | Avg pore dia (nm) |
|---|---|---|---|---|---|---|---|
| AE | 0.99732 | 1.558 | 2630 | 1.111 | 0.418 | 0.028 | 2.4 |
| AE/AM (0.75:0.25) | 0.99584 | 1.079 | 1930 | 0.8684 | 0.1827 | 0.028 | 2.2 |
| AE/AM (0.5:0.5) | 0.99743 | 1.121 | 1832 | 0.765 | 0.298 | 0.058 | 2.5 |
| AM | 0.99637 | 0.5101 | 941.4 | 0.4291 | 0.0635 | 0.0174 | 2.16 |
| $AE/SiO_2$ | 0.9994 | 0.3237 | 525.3 | 0.241 | 0.014 | 0.069 | 3.4 |
| $AM/SiO_2$ | 0.9994 | 0.3928 | 633.6 | 0.309 | 0.016 | 0.0701 | 2.2 |
| $SiO_2$ | 0.9994 | 0.4928 | 679.3 | 0.2123 | 0.028 | 0.253 | 2.9 |

The BET surface area of the carbon monolith formed using the APTMS catalyst material was measured to be about 941.40 $m^2/g$. The BET surface area was observed to increase with an increase in ratio of the APTES and APTMS catalyst materials. As can be seen, the BET surface area of the carbon monolith formed with APTES and APTMS with a concentration ratio of 0.5:0.5 was measured to be about 1832 $m^2/g$. Further, increase in the ratio of the concentration of APTES and APTMS ratio to 0.75:0.25 resulted in carbon monoliths with BET area of about 1930 $m^2/g$. Moreover, the BET area of carbon monoliths formed using APTES was measured to be about to 2630 $m^2/g$.

Example 3: Porosity Distribution of the Synthesized Composite Carbon Monoliths

Figure 5:
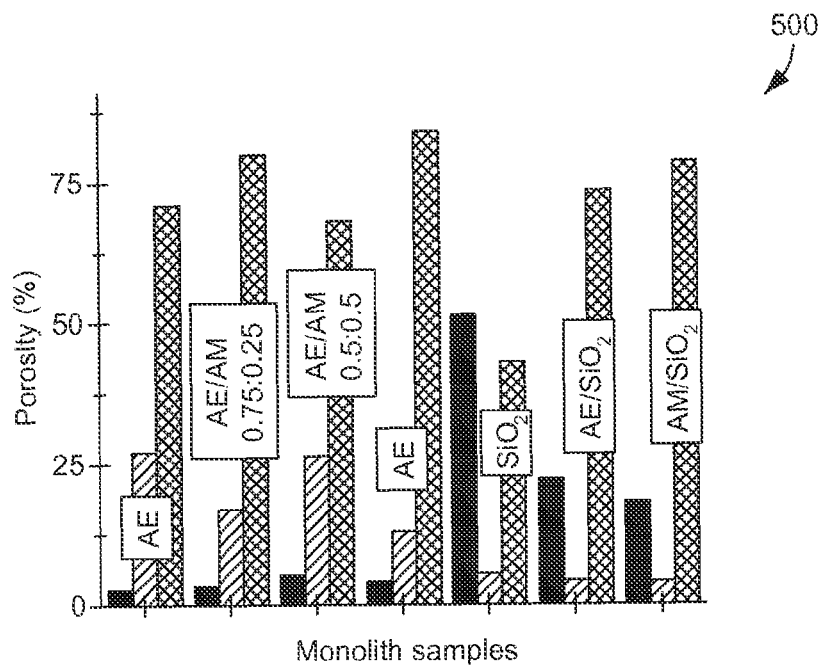
FIG. 5 is an example histogram illustrating porosity distributions of composite carbon monoliths.

FIG. 5 is an example histogram 500 illustrating porosity distributions of the synthesized composite carbon monoliths. The surface area of micropores of the carbon monolith was compared with surface area of micropores of silica-carbon aerogels and it was observed that the area of micropores in silica-carbon aerogels was substantially larger than area of micropores in silica-polymer aerogels.

As can be seen from FIG. 5, the surface area of micropores in the carbon-silica composite increased with decrease in the ratio of resorsiuonal (R) and APTES, indicating that micropores were substantially developed during pyrolysis of the polymer-silica composite. Moreover, silica provided the mechanical support to the monolith and its removal further increased mesoporosity of the monolith.

Example 4: Synthesis of Carbon Monoliths with Embedded Metal Nanoparticles

Figure 6:
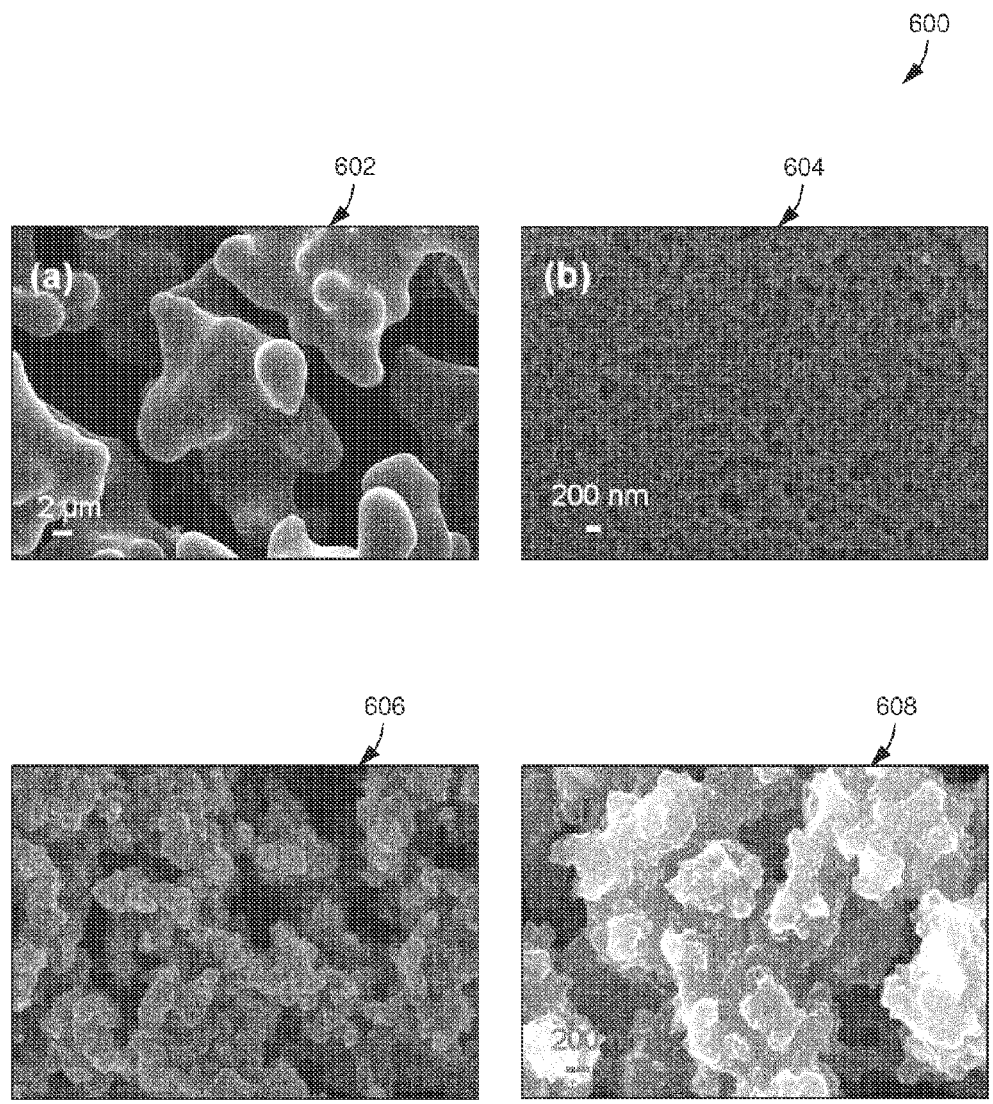
FIG. 6 illustrates example SEM images of carbon monoliths.

The carbon monoliths of Example 1 were embedded with silver and such monoliths were analyzed for their catalytic performance. Here, silver nitrate was used as the metal precursor that reduced to nitrogen dioxide (NO$_2$), oxygen (O$_2$) and metallic silver that was reduced to silver (Ag) nanoparticles during the carbonization process. FIG. 6 illustrates example SEM images 600 of carbon monoliths. The SEM images of the porous carbon monoliths formed using APTES and APTMS as catalyst materials are represented by reference numerals 602 and 604.

Image 602 was obtained at an image resolution of about 2 μm and image 604 was obtained at an image resolution of about 200 nm. As can be seen, the carbon monoliths have a macro and meso porous structure. The SEM images of the porous carbon monoliths formed using APTES and APTMS as catalyst materials with embedded silver nanoparticles are represented by reference numerals 606 and 608. Image 606 was obtained at an image resolution of about 2 μm and image 608 was obtained at an image resolution of about 200 nm. As can be seen from images 606 and 608, the silver nanoparticles were observed to be uniformly distributed over the carbon monoliths. The average diameter of the embedded silver nanoparticles was measured to be about 30 nm.

Further, energy dispersive x-ray spectroscopy (EDX) was performed for the carbon monoliths embedded with the silver nanoparticles. The weight percentage of carbon, silicon and silver nanoparticles estimated from the EDX are provided below in Table 2.

TABLE 2

| Element | Weight % | Weight % | Atomic % |
| --- | --- | --- | --- |
| Carbon | 72.926 | 1.21 | 89.839 |
| Silicon | 16.546 | 0.64 | 8.717 |
| Silver | 10.528 | 1.285 | 1.444 |

Figure 7:
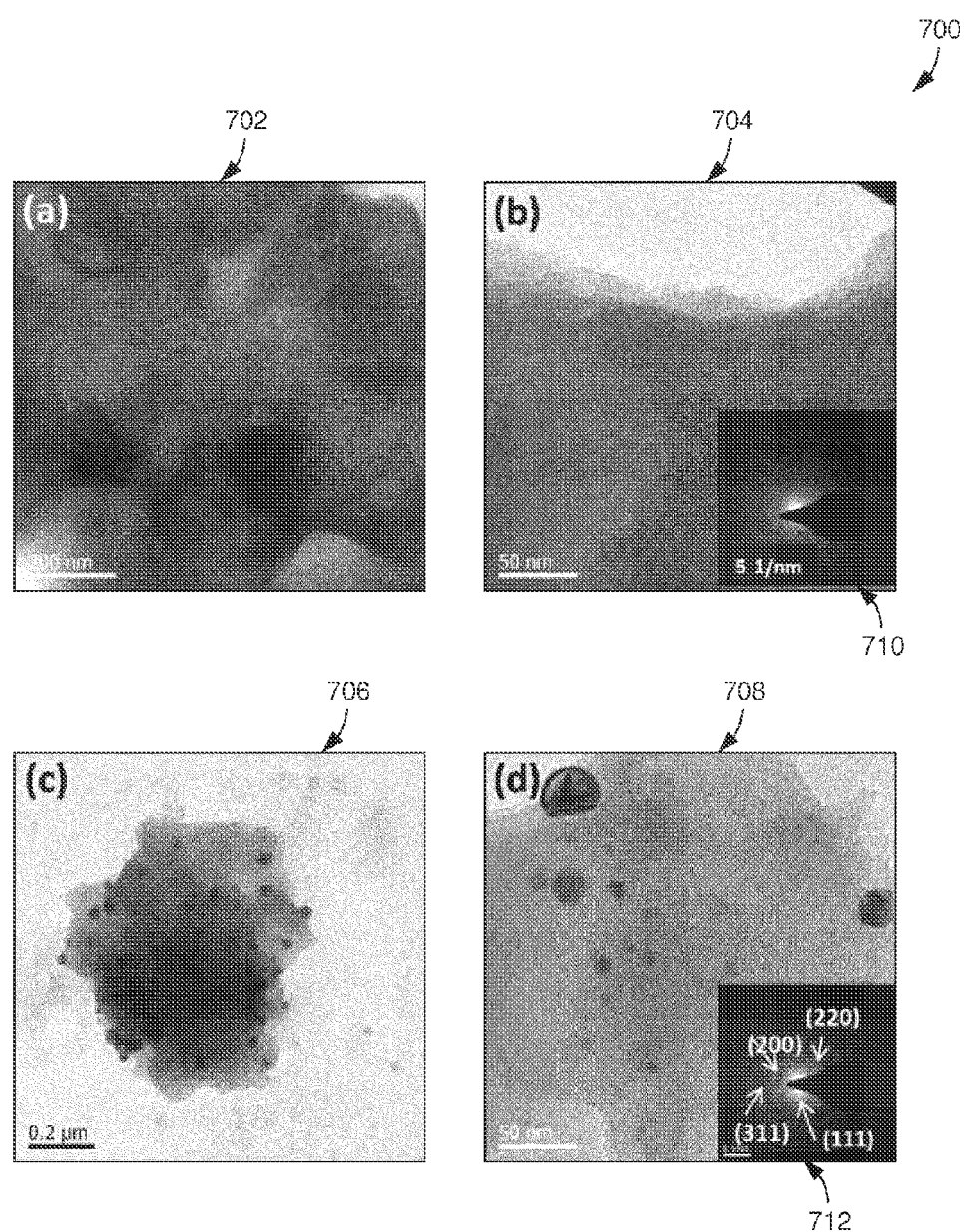
FIG. 7 illustrates example transmission electron microscopy (TEM) images of porous carbon monoliths.

Example 5: Characterization of Carbon Monoliths with Embedded Metal Nanoparticles FIG. 7 illustrates example transmission electron microscopy (TEM) images 700 of porous carbon monoliths. The TEM images of the porous carbon monoliths are represented by reference numerals 702 and 704. The image 702 was obtained at an image resolution of about 0.2 μm and the image 704 is obtained at an image resolution of about 50 nm. Moreover, the TEM images of the porous carbon monoliths with embedded silver nanoparticles are represented by reference numerals 706 and 708. The image 706 was obtained at an image resolution of about 0.2 μm and the image 708 was obtained at an image resolution of about 50 nm. Further, selected area diffraction patterns of the carbon monoliths and the carbon monoliths with embedded silver nanoparticles are represented by reference numerals 710 and 712.

As can be seen, no crystallinity was observed in the porous carbon monoliths. Further, the images 706 and 708 confirmed the presence of bead like silver nanoparticles dispersed on the monolith having an average diameter of about 30 nm. Here, the crystalline nature of the face centered cubic (FCC) silver nanoparticles was confirmed by concentric rings of SAED pattern 712 as shown in image 708.

Example 6: Raman Spectral Analysis of the Porous Monoliths

Figure 8:
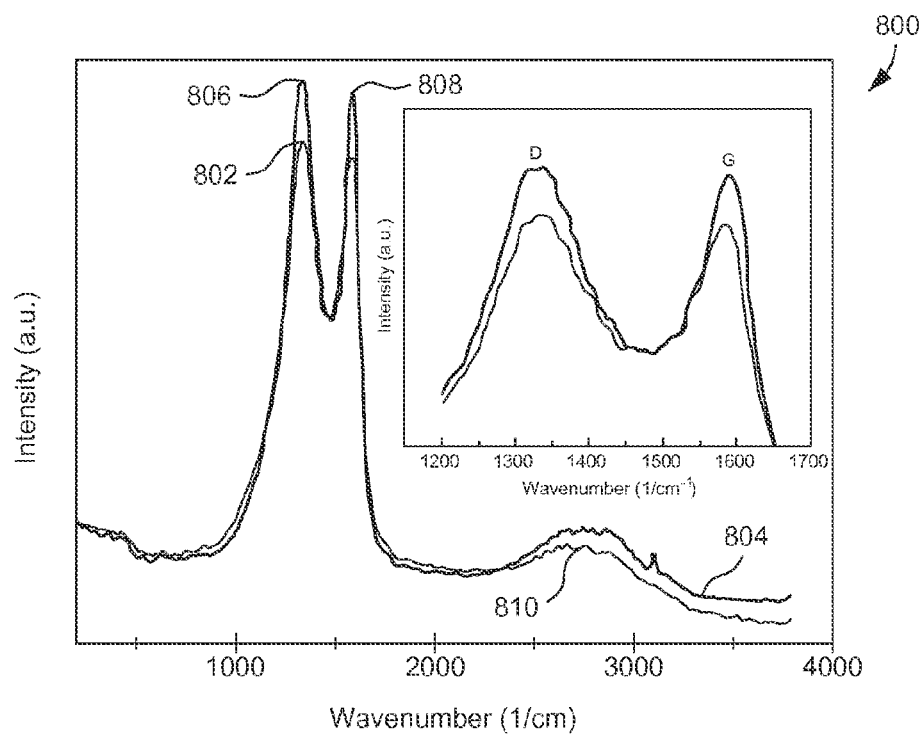
FIG. 8 illustrates example Raman spectra of a carbon monolith and a carbon monolith with embedded silver nanoparticles.

Raman spectral analysis was performed for the carbon monoliths and the carbon monoliths with embedded silver nanoparticles to analyze the phase composition and graphitic content of the monoliths after carbonization. FIG. 8 illustrates example Raman spectra 800 of the carbon monolith and the carbon monolith with embedded silver nanoparticles. The spectrum of the carbon monolith is represented by reference numeral 802 and the spectrum of the carbon monolith with embedded silver nanoparticles is represented by reference numeral 804. As can be seen, the spectrum 802 of the porous carbon comprises two major characteristic peaks (represented by reference numerals 806 and 808) at wavelengths of about 1338 cm$^{-1}$ and about 1589 cm$^{-1}$ respectively corresponding to the fundamental D and G bands for carbon.

Additionally, the broad peak or hump around 2800 cm$^{-1}$ (generally represented by 810) corresponding to the 2D band of carbon was also observed. The presence of the D band confirmed the presence of carbon allotrope. Moreover, D/G band intensity ratio was used to assess the graphitic nature of the carbon. Here, for the porous carbon monolith, the $A_D/A_G$ ratio was estimated to be of about 1.62 that indicated that a partial graphitization occurred with amorphous domain in the carbon samples.

The Raman spectrum of the carbon monolith with embedded silver nanoparticles 804 was observed to be substantially similar to that of the porous carbon monolith, indicating that the silver nanoparticles were physio-adsorbed to the carbon monoliths and did not have any bonding with carbon. Further, no Raman signal was observed corresponding to metallic silver indicating that the silver was present in Ag° state and was held there by the porous carbon support.

Further, the $A_D/A_G$ ratio for the carbon monolith with embedded silver nanoparticles was estimated to be of about 1.50 which indicated relatively enhanced graphitization compared to the carbon monolith.

Example 7: X-Ray Diffraction (XRD) Analysis of the Porous Monoliths

Figure 9:
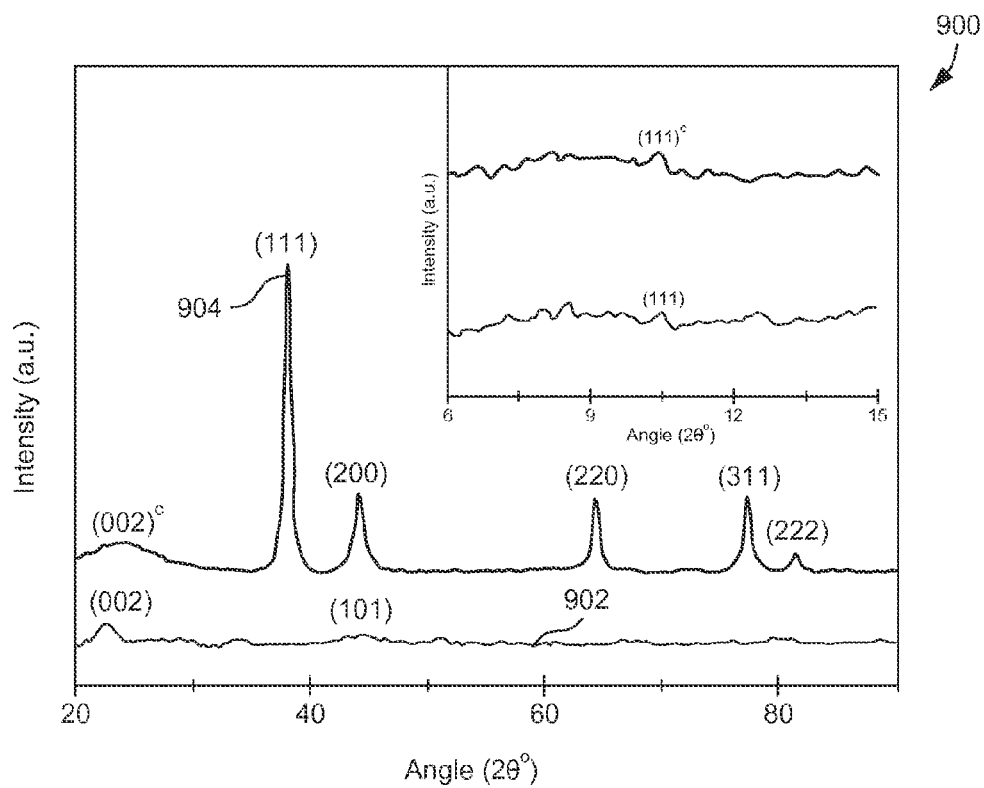
FIG. 9 illustrates example X-ray diffraction (XRD) pattern of carbon monoliths and the carbon monoliths with embedded silver nanoparticles.

FIG. 9 illustrates example X-ray diffraction (XRD) pattern 900 of the carbon monoliths and the carbon monoliths with embedded silver nanoparticles. The spectrum of the carbon monolith is represented by reference numeral 902 and the spectrum of the carbon monolith with embedded silver nanoparticles is represented by reference numeral 904.

The wide-angle X-Ray diffraction patterns for the synthesized hierarchical porous carbon monolith after removal of silica by sodium hydroxide (NaOH) treatment from resorcinol carbon precursors are shown in FIG. 9. A broad peak or hump was observed at an angle of about 2θ=23° (generally represented by (002) reflections) characteristic for partial graphitic domains. Another broad peak was observed at an angle of about 2θ=44° (generally represented by (101) reflections) characteristic for partial graphitic domains. Further, a peak at an angle of about 2θ=10.3° (generally represented by (111) reflections) was observed corresponding to plane of carbon.

Example 8: Synthesis of Hierarchical Porous Silica Dioxide (SiO$_2$)

Hierarchical porous silica dioxide (SiO$_2$) was synthesized by burning carbon from carbon-silica composite monoliths. The calcination of the carbon-silica composite eliminated carbon from the carbon-silica composite in the form of carbon dioxide (CO$_2$) to form porous silica dioxide monolith. The synthesized silica dioxide (SiO$_2$) particles were measured to have about 50% macroporosity, about 43% microporosity and about 7% mesoporosity indicating that silica dioxide (SiO$_2$) facilitates formation of mesopores in carbon monoliths. The yield for synthesis of silica dioxide ($SiO_2$) from the carbon-silica monolith was estimated to be about 24.92±2.5%.

Figure 10:
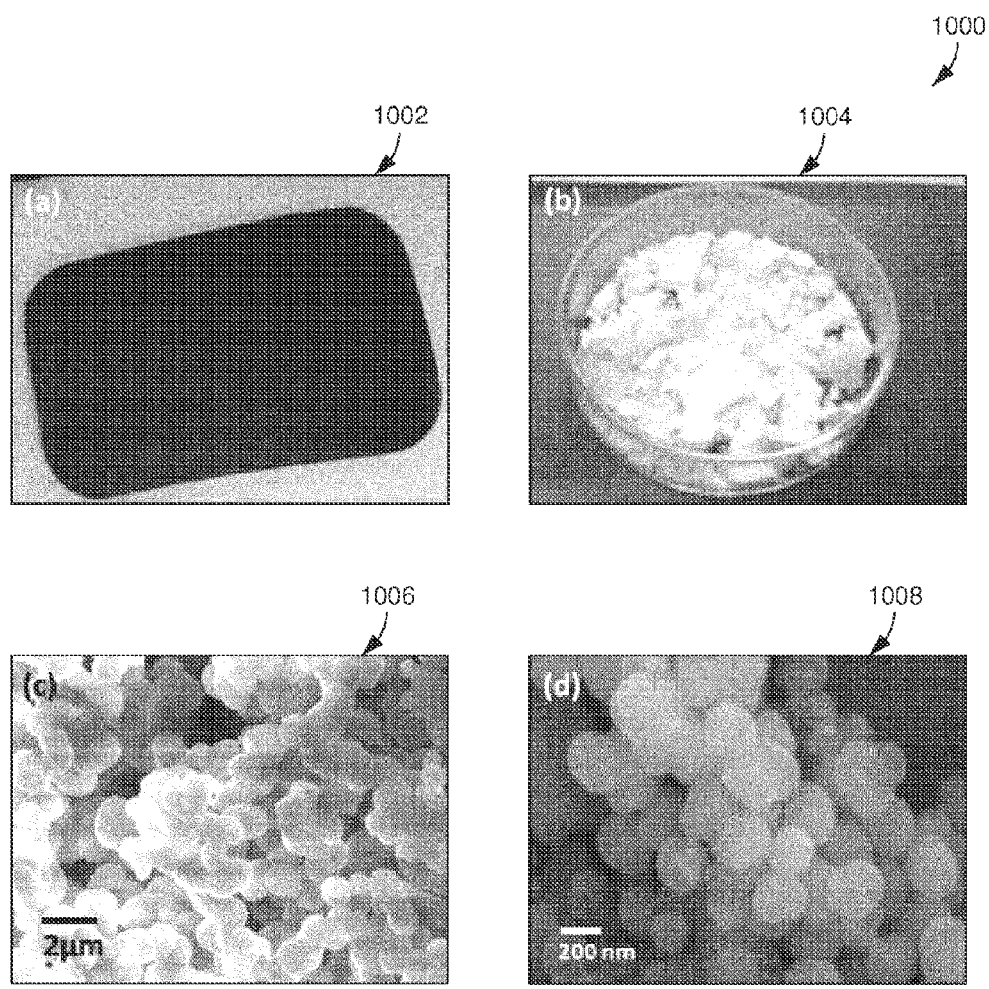
FIG. 10 illustrates example images of a carbon-silica and silica monoliths.

FIG. 10 illustrates example images 1000 of a carbon-silica and silica monoliths. The image of the synthesized carbon-silica composite monoliths and porous silica monolith formed after calcination of the carbon-silica composite monoliths are represented by reference numerals 1002 and 1004. Moreover, image 1006 illustrates a FE-SEM micrograph of porous silica and the image 1008 illustrates a magnified image of the porous silica. As can be seen from image 1008, spherical silica nanospheres were observed in the porous silica monolith.

Figure 11:
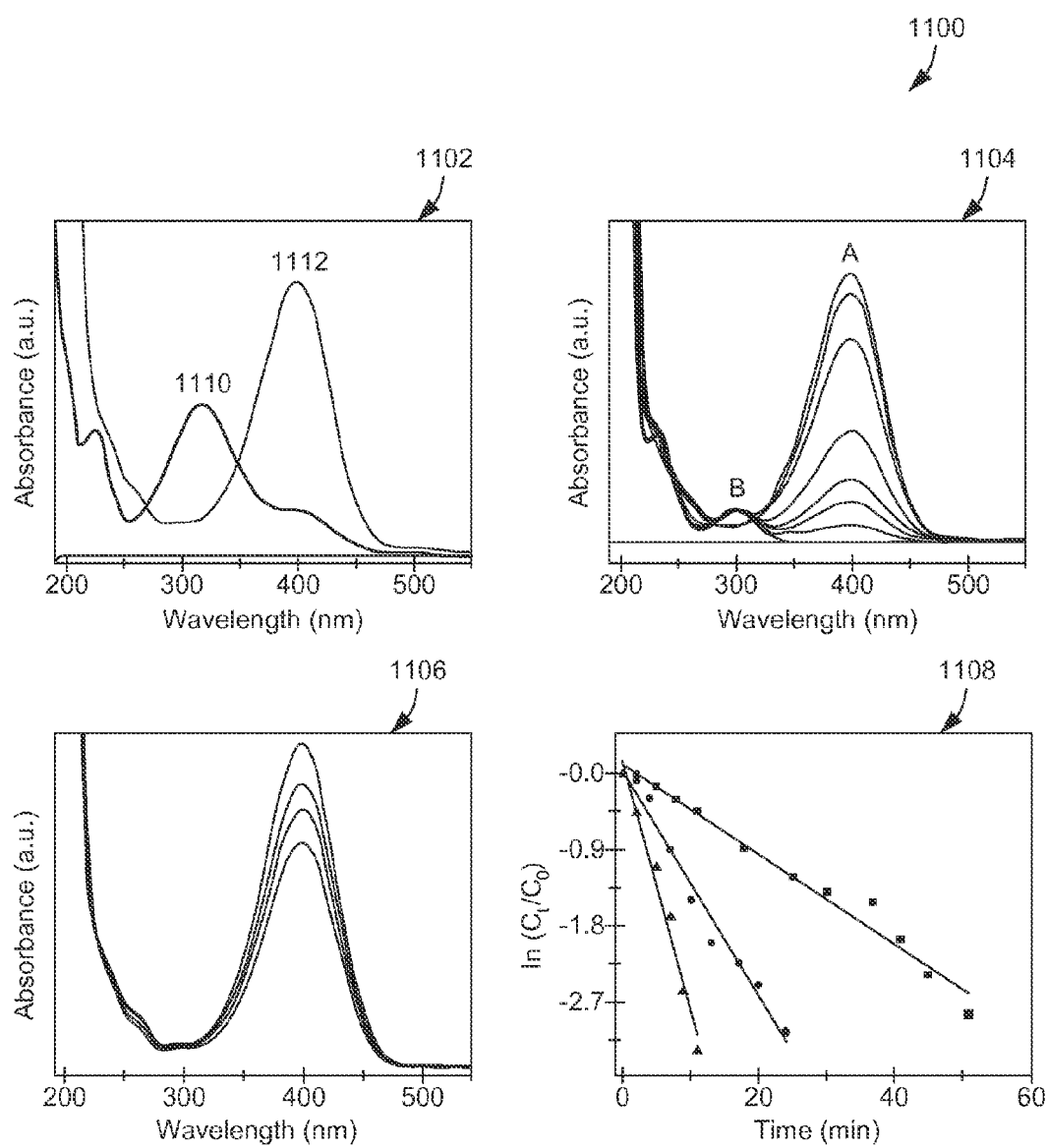
FIG. 11 illustrates example ultraviolet-visible spectra (UV-Vis) of 4-nitrophenol (4-NP) with sodium borohydride ($NaBH_4$) mediated with carbon monoliths with embedded silver nanoparticles.

Example 9: Catalytic Performance of Porous Carbon Monoliths with Embedded Silver Nanoparticles The catalytic reduction of 4-nitrophenol (4-NP) with sodium borohydride ($NaBH_4$) mediated with carbon monoliths having embedded silver nanoparticles was spectrophotometrically observed in an aqueous medium. FIG. 11 illustrates example ultraviolet-visible spectra (UV-Vis) 1100 of 4-NP with $NaBH_4$ mediated with carbon monoliths having embedded silver nanoparticles. The UV-Vis spectrum of 4-NP with $NaBH_4$ is represented by reference numeral 1102 and the UV-Vis spectrum of reduction of 4-NP to 4-aminophenol (4-AP) for carbon monoliths having about 50 milligrams of silver loading is represented by reference numeral 1104. Further, the UV-Vis spectrum of 4-NP with carbon monoliths without the silver nanoparticles is represented by reference numeral 1106. In addition, estimated rate constants for different catalyst loadings are represented by reference numeral 1108.

Here, the spectrum for 4-NP is represented by profile 1110 and the spectrum for 4-NP with $NaBH_4$ is represented by profile 1112. As can be seen from profile 1110, the aqueous solution of 4-nitrophenol (4-NP) has maximum absorption at wavelength of about 317 nm. It was observed that on addition of aqueous sodium borohydride ($NaBH_4$) solution, the peak corresponding to the wavelength of about 317 nm due to 4-NP shifted to the wavelength at about 400 nm. This peak was observed due to formation of 4-nitrophenolate ions by addition of sodium borohydride ($NaBH_4$) with 4-NP. Moreover, the peak corresponding to 4-nitrophenolate ions at a wavelength of about 400 nm was unaltered in absence of any catalyst as the thermodynamic reduction of 4-NP was not observed.

Moreover, addition of about 25 mg, about 50 mg and about 100 mg of hierarchical porous carbon-bound silver nanoparticles to the reaction mixture facilitated reduction of 4-NP due to the steady exchange of nitrophenolate ions with the silver catalyst. The reduction was confirmed by gradual disappearance of the peak corresponding to the wavelength of 400 nm along with concurrent appearance of a peak at a wavelength of about 295 nm indicating formation of 4-aminophenol (4-AP).

It was observed that the reduction of 4-NP was initiated as soon as the carbon monoliths with embedded silver nanoparticles were immersed in the 4-NP/$NaBH_4$ solution. As $NaBH_4$ was added to the mixture, the silver particles facilitated the catalytic reduction of 4-NP by transferring electrons from the donor $BH_4$ to the acceptor 4-NP right upon adsorption of both onto the surface of the silver particles surface. Further, liberated hydrogen from $BH_4$ purged out the air thereby preventing the aerial oxidation of the formed 4-aminophenol product.

The amount of catalyst was varied in the reaction and the reaction rate was estimated for different loadings of the catalyst. The rate constant ($K_t$) for the catalytic reaction was estimated from the slope of the $\ln(C_t/C_0)$ vs. time (t) profiles 1108, where $C_t$ and $C_0$ are concentrations of the 4-NP at 't' and '0' time, respectively. Here, the ratio ($C_t/C_0$) was measured from the respective absorbance at a wavelength of about 400 nm. As can be seen from profile 1108, the reduction reaction rate was observed to increase with an increase in the amount of the silver loading in the carbon monoliths. The estimated reaction rate for different catalyst loadings are provided in Table 3.

TABLE 3

| | Ag/carbon catalyst loading (mg) | | |
|---|---|---|---|
| | 25 | 50 | 100 |
| Amount of silver NPs (mg) | 3.012 | 6.02 | 12.04 |
| Rate constant (Kt) (min−1) | 0.053 | 0.137 | 0.295 |

As can be seen, the silver nanoparticles embedded in the carbon monoliths facilitated catalytic conversion of 4-nitrophenol to 4-aminophenol. The catalyst particles were observed to be active until the completion of the reduction reaction. The used catalyst was subsequently washed thoroughly with distilled water and was dried at room temperature for further use.

Figure 12:
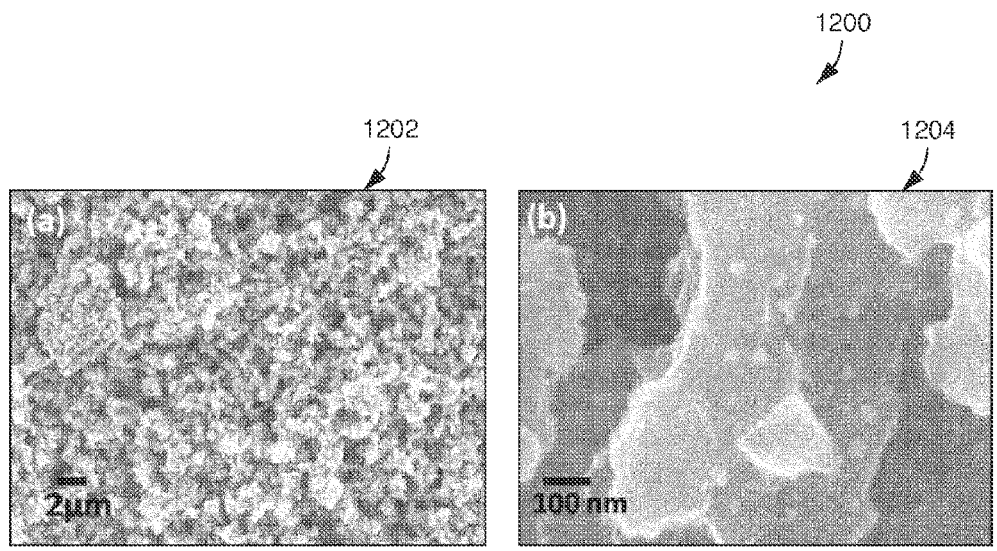
FIG. 12 illustrates example FE-SEM images of porous carbon monoliths after catalytic reduction of 4-NP.

FIG. 12 illustrates example FE-SEM images 1200 of the porous carbon monoliths after catalytic reduction of 4-NP. The image 1202 is obtained at an image resolution of about 2 μm and the image 1204 is obtained at an image resolution of about 100 nm. As can be seen, the silver nanoparticles were observed to be retained on the surface of the carbon monoliths after the catalysis reaction. The monoliths with the silver nanoparticles were washed and reused.

Figure 13:
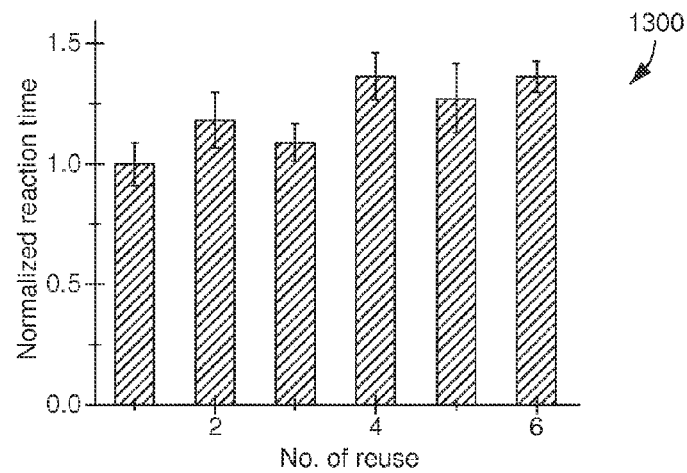
FIG. 13 illustrates an example histogram of reuse data for a catalyst material.

FIG. 13 illustrates an example histogram 1300 of reuse data for the catalyst material. As can be seen, the carbon monoliths with the silver nanoparticles can be reused for a large number of reduction reactions such as for the reduction of 4-NP with $NaBH_4$.

The techniques of forming the hierarchically porous monoliths described above provide an efficient one-step sol-gel process based on co-assembly of organic and inorganic precursors simultaneously along with phase separation induced by the ongoing polymerization. The hierarchically porous monoliths have high BET surface area with tunable porosity in meso, micro and macro-structured domains. The present technique is template-free as no synthesized structure is required as a template for generation of porosity in the monoliths.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method to form a hierarchical porous monolith, the method comprising:
   mixing a monomer, a silica precursor, and a catalyst in a solvent to form a mixture, wherein the silica precursor comprises tetraethyl orthosilicate (TEOS), tetra methyl orthosilicate (TMOS), or a combination thereof, and wherein the catalyst comprises 3-aminopropyl triethoxysilane (APTES), 3-aminopropyl tri-methoxysilane (APTMS), or a combination thereof;
   adding a gelling agent to the mixture to form a polymer-silica composite gel, wherein the polymer-silica composite gel undergoes a phase separation to separate from the solvent and an unreacted silica precursor;
   drying the polymer-silica composite gel to evaporate the solvent to form a polymer-silica monolith; and
   processing the polymer-silica monolith to form at least one of a polymer monolith, a carbon monolith, a silica monolith, and a carbon-silica monolith.

2. The method of claim 1, wherein mixing the monomer comprises mixing resorcinol ($C_6H_6O_2$), phloroglucinol ($C_6H_6O_3$), acrylonitrile ($C_3H_3N$), vinyl alcohol ($C_2H_4O$), methyl methacrylate ($C_5H_8O_2$), or combinations of any two or more thereof.

3. The method of claim 1, wherein adding the gelling agent comprises adding formaldehyde ($CH_2O$), dimethyl sulfoxide ($C_2H_6SO$), water ($H_2O$), dimethylformamide (($CH_3)_2NC(O)H$), or combinations of any two or more thereof.

4. The method of claim 1, wherein mixing the monomer, the silica precursor, and the catalyst in the solvent comprises mixing the monomer, the silica precursor, and the catalyst in a solvent selected from the group consisting of dimethyl sulfoxide (($CH_3)_2SO$), dimethyl formamide (($CH_3)_2NC(O)H$), tetrahydrofuran (($CH_2)_4$), acetone (($CH_3)_2CO$), ethanol $CH_3CH_2OH$, methanol (($CH_3OH$), water ($H_2O$), or combinations of any two or more thereof.

5. The method of claim 1, wherein drying the polymer-silica composite gel is performed at a temperature of about 4° C. to about 300° C. and for a period of about 10 hours to about 48 hours.

6. The method of claim 1, wherein processing the polymer-silica monolith comprises pyrolyzing the polymer-silica monolith to form the carbon-silica monolith.

7. The method of claim 6, wherein pyrolyzing the polymer-silica monolith comprises:
carbonizing the polymer-silica monolith in an atmosphere of nitrogen ($N_2$);
heating the polymer-silica monolith to form the carbon-silica monolith; and
cooling the carbon-silica monolith at ambient temperature.

8. The method of claim 7, wherein heating the polymer-silica monolith is performed at a temperature of about 500° C. to about 1500° C. and at a rate of about 3° C./minute to about 10° C./minute.

9. The method of claim 6, wherein processing the polymer-silica monolith further comprises etching silica from the carbon-silica monolith using an alkali hydroxide to form the carbon monolith.

10. The method of claim 9, wherein etching silica from the carbon-silica monolith using the alkali hydroxide comprises etching silica from the carbon-silica monolith using sodium hydroxide (NaOH), potassium hydroxide (KOH), hydrofluoric acid (HF), or combinations of any two or more thereof.

11. The method of claim 6, wherein processing the polymer-silica monolith further comprises burning carbon from the carbon-silica monolith to form the silica monolith.

12. The method of claim 1, further comprising embedding a plurality of metal nanoparticles in the hierarchical porous monolith.

13. The method of claim 12, wherein embedding the plurality of metal nanoparticles comprises embedding silver (Ag) nanoparticles, copper (Cu) nanoparticles, gold (Au) nanoparticles, platinum (Pt) nanoparticles, nickel (Ni) nanoparticles, cobalt (Co) nanoparticles, ferrous (Fe) nanoparticles, titanium dioxide ($TiO_2$), zinc oxide (ZnO), zirconium dioxide ($ZrO_2$), tin dioxide ($SnO_2$), tin oxide (SnO), silicon dioxide ($SiO_2$), or combinations of any two or more thereof.

14. The method of claim 1, wherein processing the polymer-silica monolith comprises etching silica from the polymer-silica monolith to form the polymer monolith.

* * * * *

UNITED STATES PATENT AND TRADEMARK OFFICE
CERTIFICATE OF CORRECTION

PATENT NO. : 9,908,102 B2  Page 1 of 1
APPLICATION NO. : 14/683070
DATED : March 6, 2018
INVENTOR(S) : Sharma et al.

It is certified that error appears in the above-identified patent and that said Letters Patent is hereby corrected as shown below:

In Column 1, Line 11, delete "and all" and insert -- or all --, therefor.

In Column 16, Line 62, in Claim 4, delete "(($CH_3OH$),"  and insert -- (($CH_3$)OH), --, therefor.

Signed and Sealed this
Twenty-ninth Day of May, 2018

Andrei Iancu
*Director of the United States Patent and Trademark Office*